United States Patent
Fortain et al.

(10) Patent No.: US 7,176,410 B2
(45) Date of Patent: Feb. 13, 2007

(54) METHOD OF WELDING MOTOR VEHICLE ELEMENTS, IN PARTICULAR TAILORED BLANKS

(75) Inventors: Jean-Marie Fortain, Osny (FR); Gérard Plottier, Pierrefitte (FR)

(73) Assignees: L'Air Liquide, Societe Anonyme a Directoire et Conseil de Surveillance pour l'Etude et l'Exploitation des Procedes Georges Claude, Paris (FR); La Soudure Autogene Francaise, Paris (FR)

( * ) Notice: Subject to any disclaimer, the term of this patent is extended or adjusted under 35 U.S.C. 154(b) by 277 days.

(21) Appl. No.: 10/503,263

(22) PCT Filed: Jan. 17, 2003

(86) PCT No.: PCT/FR03/00154

§ 371 (c)(1),
(2), (4) Date: Jul. 29, 2004

(87) PCT Pub. No.: WO03/064096

PCT Pub. Date: Aug. 7, 2003

(65) Prior Publication Data

US 2005/0139583 A1 Jun. 30, 2005

(30) Foreign Application Priority Data

Feb. 1, 2002 (FR) .................................. 02 01215

(51) Int. Cl.
*B23K 9/00* (2006.01)

(52) U.S. Cl. .............................. 219/137 PS; 219/137.71

(58) Field of Classification Search .......... 219/137 PS, 219/137 R, 137.7, 137.71, 124.4, 125.1
See application file for complete search history.

(56) References Cited

U.S. PATENT DOCUMENTS

| | | | | | |
|---|---|---|---|---|---|
| 2,827,547 | A | * | 3/1958 | Tiedemann | 219/124.4 |
| 3,339,057 | A | * | 8/1967 | Bernard et al. | 219/137.7 |
| 3,581,053 | A | * | 5/1971 | Manz | 219/137 PS |
| 6,627,850 | B1 | * | 9/2003 | Koga et al. | 219/137.71 |

FOREIGN PATENT DOCUMENTS

| | | |
|---|---|---|
| DE | 197 38 785 | 4/1999 |
| WO | WO 00 64620 | 11/2000 |

OTHER PUBLICATIONS

*Direct Control of the Material Transfer: The Controlled Short Circuit (CSC)-MIG Process*, by G. Huismann, pp. 165-172 published in Gas Metal Arc Welding for the 21$^{st}$ Century, AWS/EWI Conference, Dec. 6-8, 2000, Orlando, Florida.
French Search Report for FR0201215.
Patent Abstracts of Japan, vol. 2000, No. 16, May 8, 2001 & JP 2001 001142, Jan. 9, 2001.
Patent Abstracts of Japan, vol. 005, No. 189, Nov. 28, 1981 & JP 56 109169, Aug. 29, 1981.

* cited by examiner

*Primary Examiner*—Clifford C. Shaw
(74) *Attorney, Agent, or Firm*—Brandon Clark

(57) ABSTRACT

An electric-arc welding process for assembling parts that are components of a motor vehicle, in which a consumable wire is used that is subjected to a cyclic mechanical movement. The wire is moved closer to and then further away from the parts to be welded so as to create a short arc between the end of the consumable wire and at least one of the parts to be joined. In this way, molten metal is deposited in order to progressively produce a welded joint between the parts.

16 Claims, No Drawings

METHOD OF WELDING MOTOR VEHICLE ELEMENTS, IN PARTICULAR TAILORED BLANKS

The present invention relates to the application of a MIG/MAG (Metal Inert Gas/Metal Active Gas) process for the electric-arc welding or braze-welding of thin panels, which may or may not be coated, particularly zinc-electroplated or galvanized panels, used mainly in the automobile construction industry sector, mainly for assembling by welding or braze-welding, various constituent components of the structure of a motor vehicle, such as body components, opening elements and floor joints, especially suspension elements.

The welding of vehicle components such as bodies employs HYS or VHYS (high yield strength or very high yield strength) steels with thicknesses that vary from 0.6 to 4 mm, and usually from 0.6 to 2 mm.

Such joints, which were originally produced by resistance welding, are now, for accessibility and corresponding robot cost reasons, produced by arc welding, essentially by an MIG process in short-arc or pulsed mode.

The MIG process in short-arc mode with low welding energy is more particularly suitable for welding poor thicknesses, but does generate spatter at initiation and in the steady state.

The MIG process in pulsed mode, because of its control, allows very good transfer control with no spatter, but its higher welding energy, even at low wire speed, results in greater penetration, which is therefore the opposite effect to that desired. In addition, it does not easily accommodate inferior or approximate preparations, such as gap or spacing between the panels to be welded together of the order of thickness of the thinnest panel.

For both these processes, detachment of the liquid metal drop at the weld pool is provided by a substantial portion of the electrical energy transmitted to the wire and recovered, via the arc, in the base metal.

This excess energy will therefore give rise to penetration that cannot be easily controlled and/or spatter directly associated with the stability of the metal transfer.

It has been attempted to solve this problem by substitution of welding with braze-welding, using copper-based filler metals, such as CuAl or CuSi alloys, having a low melting point and, in all cases a melting point very much below that of the base metal.

In this way, the energy recovered in the panel is reduced, as therefore are penetration and deformation.

This process fits in well with industrial preparation when there is an inter-panel gap but, on the other hand, the cost of the filler metal significantly penalizes the generalization of its application in the industrial field, in particular in the automobile construction sector.

Moreover, the success of welding is also dependent on the potential of the process to control the problem of zinc vaporization and outgassing in the case of welding panels coated with a zinc layer.

The reason for this is that, in general, zinc, which constitutes the principle of the panel coating of this type, is characterized by a zinc melting point of around 420° C. and a boiling point of around 906° C., which temperatures are very much less than that of the base metal, i.e. of the panels to be assembled, and of the filler metal, i.e. the consumable wire. Consequently, the zinc is therefore vaporized during the welding operation through direct action of the electric arc but also by simple thermal conduction at the front and along the edges of the weld pool.

Upstream of the weld pool, the zinc vapor disturbs the gas shield and the transfer, and thus results in porosity in the bead, but also instability and spatter.

This phenomenon is more appreciable the greater the thickness of the coating relative to the welded thickness and the joint configurations, in particular of the lap weld type, which are used in the majority of cases in applications in the automobile sector, having at the interface two trapped contiguous zinc layers, which aggravate the outgassing conditions.

From the application standpoint, although the tolerances on accepting porosity are well defined as regards closed porosity, there is generally zero tolerance as regards open porosity with respect to visual criteria, i.e. esthetic appearance and subsequent painting conditions in vehicle manufacturing lines.

The alternative of braze-welding also has the advantage of injecting substantially less energy, since it is only the wire that has to be melted, and not the panels, and the amount of the vaporized zinc is therefore greatly reduced compared with conventional welding.

However, all these advantages become minor owing to the cost of the filler metal, i.e. the braze-welding wire, that has to be used.

In short, the problem that arises specifically in the welding of components dedicated to the automobile construction sector is that, as explained above, the short-arc and pulsed welding processes do not make it possible to simultaneously meet the requirements in terms of penetration and deformation control, owing to the excess energy recovered in the panel, or spatter control owing to the substantial amount of energy to be used in order to detach the molten metal drops, although the braze-welding process does lead to advantages in terms of welding quality and comfort, to the detriment of a much higher overall cost of the process due to the use of consumable brazing wire made of rather expensive special alloys.

The object of the invention is therefore to solve these problems of the prior art by providing an industrial solution perfectly suitable for the automobile manufacturing sector, making it possible to prevent spatter, to use minimal energy, to achieve higher welding speeds and less panel penetration and deformation.

The solution of the invention is therefore an electric-arc welding process using a consumable wire that is subjected to a cyclic mechanical movement, whereby it is moved, closer to and then further away from the parts to be welded so as to create a short arc between the end of the consumable wire and at least one of the parts to be joined, and thus to deposit molten metal in order to progressively produce a welded joint between said parts, characterized in that the parts to be assembled are constituent components of a motor vehicle.

Depending on the case, the process of the invention may include one or more of the following technical features:
  the cyclic mechanical movement whereby the wire is brought closer to and further away from the weld pool is controlled, in terms of frequency, speeds, arc-stabilization peak time and background time in contact with the weld pool, by at least one microprocessor in synchronization with a current source used to generate the arc and the welding current;
  the components to be welded have a thickness of less than 5 mm, preferably between 0.5 and 2 mm;
  the elements to be welded have a zinc coating on at least one of their faces.
  the metal parts are made of nonalloy carbon steel of high or very high yield strength;

at least one portion of the metal parts to be assembled are:
made of aluminum or aluminum alloy and chosen from
bodies or body parts, particularly the panel/extrusion or
extrusion/extrusion joints; opening elements, such as
doors or hoods; floor joint components, such as suspension arms, cradles, cross-members and rims; or at least one portion of the metal parts to be assembled are
made of austenitic or ferritic stainless steels, particularly exhaust muffleres or parts of exhaust muffleres.

at least one portion of the components to be assembled are chosen from the group formed by the body, body floor, tailored blanks, longitudinal members, wheel arches, under-seat cross-members, pillar reinforcements, dashboard cross-members, front end cross-members, shock absorbers and engine cradles;

the intensity of the current is between 30A and 250A depending the nature and the diameter or the cross section of the wire;

the filler metal is in the form of a wire with a diameter of between 1.2 and 3.2 mm or of a strip of cross section between 0.5×4 and 0.6×5 mm$^2$;

the filler metal is made of nonalloy or low-alloy steel, austenitic or ferritic stainless steel, nickel or nickel alloys, copper or copper alloys, or aluminum or aluminum alloys; and the weld beads to be produced have a length of between 5 and 100 mm, preferably between 10 mm and 70 mm. However, in some applications, it is also possible to weld seams of much longer length, for example of the order of one meter in the case of exhaust mufflers, or even several meters.

The invention also relates to a process for manufacturing motor vehicles formed from several components assembled by a welding process according to the invention, preferably carried out by a welding robot, for example on a motor vehicle manufacturing line.

The principle of the invention is based on the fact of forcing a short arc to be formed between the consumable wire and the panels to be assembled by performing a "mechanical" lowering of the wire toward the panels to be welded, so as to deposit the molten metal drop into the weld pool, followed by a subsequent mechanical removal of the wire after the metal drop has been deposited.

This cycle of mechanically lowering and raising the wire must be controlled in terms of frequency, speeds, peak time and background time by one or more microprocessors in synchronization with the current source.

Under these conditions, the electrical energy delivered is strictly intended for melting the wire. It is therefore reduced by a factor of 2 to 3 compared with that normally applied in a conventional MIG process.

The application of this process is therefore particularly beneficial in the sector of the manufacture of motor vehicle components.

The advantages afforded by this manner of producing the short arc and therefore the deposition of molten metal drops are, on the one hand, no spatter, because of direct mechanical injection of the molten wire into the weld pool, and, on the other hand, energy entirely available for melting the wire, and therefore higher welding speeds while permitting assembly with much reduced penetration and deformation.

Depending on the joint configuration, it is possible to achieve speeds 2 to 3 times greater than those obtained, in single-wire welding, in the two aforementioned transfer modes of the prior art.

This welding energy dedicated essentially to melting the wire, and therefore much reduced energy on the panels, thus very appreciably reduces zinc vaporization in front of and in the weld pool. This therefore greatly reduces instability and spatter, but also limits impairment of the coating on the top side and on either side of the bead, but also on the opposite side, that is to say on the back face, which may become predominant in certain vehicle components, in particular when the corrosion resistance of regions not accessible before painting is taken into consideration.

The invention is particularly suitable for the assembly of "body-in-white" vehicle components (panels not prepainted or painted) from the following various constituent components: body floor, tailored blanks, hydroformed or reconstituted longitudinal members, wheel arcs, under-seat cross-members, center pillar reinforcements, dashboard cross-members, front-end cross-members, longitudinal members and shock absorbers (whether hydroformed or reconstituted) and engine cradle.

The thickness range of these pressed or stamped or hydroformed components that can be welded in this way is from 0.6 to 2 mm.

These vehicle components are generally coated on both sides by zinc electroplating or galvanizing.

Depending on the chronological order of assembly of the elementary components up to that of the final subassemblies, the final preparations, in terms of gaps and misalignment, will therefore build up all the individual tolerances before reaching values requiring either a modification of the existing welding procedure, especially a "sweep", i.e. welding with transverse oscillation of the torch relative to the joint plane, with a reduction in welding speed for example, or the adoption of a more flexible process, for example a braze-welding process instead of welding.

The beads to be produced are typically discontinuous beads varying in length between 15 and 60 mm, which are "mechanically effective" over their entire length; that is to say designed with respect to fatigue strength but also head-on or even side impact crash tests. It is therefore essential for the start and end of the beads to be also well controlled, and without any spatter.

Other components, such as exhaust mufflers, are instead produced from ferritic or austenitic stainless steel in thickness ranges from 0.6 mm to 2 mm. The critical factor in the welding operation is very similar to that of bodies, in particular as regards preparation and possible degradation of the base metal and of the catalyst that they contain. To this are also added thermal fatigue resistance and corrosion resistance problems. The invention is in this case also particularly suitable for high-speed welding of circular components, without spatter and without degradation of the heat-affected zones of ferritic stainless steels, and of the catalytic converter.

To implement the invention, the following are used for example: a current generator of the 480 TRS type from La Soudure Autogene Francaise, a MIG welding torch with a wire feed device, a wire pay-out, and a device for giving the wire an alternating reciprocal, i.e. up-and-down, movement.

The installation for implementing the invention is composed of a pay-out module, comprising a drive system of press rolls coupled to an electric motor with or without an intermediate speed reducer. Wire pay-out control may be provided by a tachymetric dynamo system for example, or by another suitable control system.

The installation also comprises, a wire feed system formed from a concentric sheath through which the consumable wire, the welding gas and, depending on the case, the torch cooling circuit pass; a pay-out module located closest to the torch, which may include one or more steppertype motors for driving the consumable wire at the desired mean speed and to provide the up-and-down movement needed for operating the process; a welding generator, as described above or a similar one; a microprocessor control module for controlling the speed and the movement of the wire, and the current delivered by the generator, in particular the current waveform.

Depending on the grade of the base metal and of the filler metal, the gas shield will be made, for example, from a gas of the $Ar/CO_2$ or $Ar/CO_2/O_2$ gas mixture type for welding nonalloy or low-alloy carbon steels, or of the $Ar/H_2/CO_2$ mixture type for braze-welding of these same materials, or a mixture of the $Ar/H_2/CO_2$ or $Ar/He/CO_2$ type for austenitic and ferritic stainless steels, and for nickel and its alloys, or else of the argon or $Ar/He$, $Ar/O_2$ or $Ar/He/O_2$ mixture type for aluminum and its alloys.

The mechanically forced short-arc MIG welding process, additional details for which may be found in particular in the document *Direct Control of the Material Transfer: The Controlled Short Circuit (CSC)-MIG Process*, by G. Huismann, pages 165–172 published in Gas Metal Arc Welding for the $21^{st}$ Century, AWS/EWI Conference, Dec. 6–8, 2000, Orlando, Fla., is particularly suitable for welding of constituent components of motor vehicles as it allows:

welding of very thin panels at low energy and high welding speed, therefore generating little dimensional deformation or distortion on an assembled vehicle body;

forced stability of the process, therefore lack of spatter in the spanning zones, but also in the bead start and root zones;

respect of the assembled materials, since the affected zones are smaller, since little energy is recovered in the base metal; and respect of the zinc coating, thanks to the low energy used, which therefore results in little zinc vaporization on the various faces of the assemblies.

The invention claimed is:

1. A method for electric-arc welding parts during the assembly of a motor vehicle comprising:
    a) subjecting a consumable wire to a cyclic mechanical movement, wherein:
        1) said wire is moved closer to and then further from said parts;
        2) said parts have a thickness of less than about 5 mm; and
        3) said parts comprise a zinc coating on at least one of their faces;
    b) creating a short arc between the end of said wire and at least one of said parts; and
    c) depositing molten metal so as to progressively produce a welded joint between said parts.

2. The method of claim 1, further comprising synchronizing the characteristics of said movement with the current source used to generate said arc and the welding current, wherein:
    a) said synchronization is performed by at least one microprocessor; and
    b) said characteristics consist of:
        1) frequency;
        2) speed;
        3) arc-stabilization peak time; and
        4) wire background time in contact with the weld pool.

3. The method of claim 2, wherein said welding is performed by a welding robot.

4. The method of claim 1, wherein said parts comprise a thickness of about 0.5 mm to about 2 mm.

5. The method of claim 1, wherein said parts comprise a nonalloy carbon steel, said steel further comprising a high or very high yield strength.

6. The method of claim 1, wherein at least one portion of said parts comprises aluminum or an aluminum alloy and further comprises at least one member selected from the group consisting of:
    a) bodies;
    b) body parts;
    c) panel/extrusion joints;
    d) extrusion/extrusion joints;
    e) opening elements;
    f) doors;
    g) hoods;
    h) floor joint components;
    i) suspension arms;
    j) cradles;
    k) cross members; and
    l) rims.

7. The method of claim 1, wherein at least one portion of said parts comprise at least one member selected from the group consisting of:
    a) an austenitic stainless steel exhaust muffler; and
    b) a ferritic stainless steel exhaust muffler.

8. The method of claim 1, wherein at least one portion of said parts comprise at least one member selected from the group consisting of:
    a) the body;
    b) the body floor;
    c) tailored blanks;
    d) longitudinal members;
    e) wheel arches;
    f) under-seat cross-members;
    g) feet reinforcements;
    h) dashboard cross-members;
    i) front end cross-members;
    j) shock absorbers; and
    k) engine cradles.

9. The method of claim 1, wherein the current is between about 30A and 250A.

10. The method of claim 9, wherein said filler metal comprises wire, wherein said wire comprises at least one member selected from the group consisting of:
    a) nonalloy carbon steel;
    b) low-alloy steel;
    c) austenitic stainless steel;
    d) ferritic stainless steel;
    e) nickel;
    f) nickel alloys;
    g) copper;
    h) copper alloys;
    i) aluminum; and
    j) aluminum alloys.

11. The method of claim 9, wherein the weld beads to be produced comprise a length of about 5 mm to about 100 mm.

12. The method of claim 11, wherein said weld beads comprise a length of about 10 mm to about 70 mm.

13. The method of claim 12, wherein said weld beads comprise a length of about 15 mm to about 60 mm.

14. The method of claim 1, wherein said filler metal comprises wire, wherein said wire comprises a diameter of about 1.2 mm to about 3.2 mm.

15. The method of claim 1, wherein said filler metal comprises a strip, wherein said strip comprises a cross section of about 0.5 mm×about 4 mm to about 0.6 mm×about 5 mm.

16. A method for manufacturing motor vehicles formed from several components comprising a welding process, wherein said process comprises:
- a) subjecting a consumable wire to a cyclic mechanical movement, wherein:
  1) said wire is moved closer to and then further from said parts;
  2) said parts have a thickness of less than about 5 mm; and
  3) said parts comprise a zinc coating on at least one of their faces;
- b) creating a short arc between the end of said wire and at least one of said parts; and
- c) depositing molten metal so as to progressively produce a welded joint between said parts.

* * * * *